United States Patent [19] [11] 3,909,545
Fuchs [45] Sept. 30, 1975

[54] EMERGENCY TRANSFER CIRCUIT FOR USE IN A COMMUNICATION SWITCHING SYSTEM

[75] Inventor: Siegfried H. Fuchs, Chicago, Ill.

[73] Assignee: GTE Automatic Electric Laboratories Incorporated, Northlake, Ill.

[22] Filed: May 2, 1974

[21] Appl. No.: 466,429

[52] U.S. Cl. ........................ 179/27 G; 179/18 AH
[51] Int. Cl. ........................ H04m 7/06
[58] Field of Search ........................ 179/27 F, 27 G

[56] References Cited

UNITED STATES PATENTS

| | | | |
|---|---|---|---|
| 2,415,057 | 1/1947 | Wicks | 179/27 B |
| 2,805,287 | 9/1957 | Brandstetter et al. | 179/27 G |

*Primary Examiner*—William C. Cooper
*Attorney, Agent, or Firm*—Robert J. Black

[57] ABSTRACT

An emergency transfer circuit for permitting an operator to extend an emergency-type call via a toll switchboard trunk circuit in the event of malfunction in the switching equipment.

7 Claims, 2 Drawing Figures

EMERGENCY TRANSFER CIRCUIT FOR USE IN A COMMUNICATION SWITCHING SYSTEM

BACKGROUND OF THE INVENTION

Field of the Invention

This invention relates to a telephone communication switching system and, in particular, to an emergency transfer circuit for such systems.

The emergency transfer circuit of the invention provides a transfer arrangement to handle emergency-type traffic via a toll switchboard in the event of a total switch outage. In the concept of the invention, a total switch outage is not to mean or include a complete power failure, or a complete physical destruction to either the switch or its building.

More particularly, the emergency transfer circuit provides a means for an operator to extend a call should there be a malfunction in the switching equipment. Normally, the switching equipment in such systems is colocated with respect to the toll switchboard, and the only means for the operator to access the outside world is via the switching equipment. If an emergency call arrives at the toll switchboard and if a malfunction exists in the switching equipment, the operator is left helpless to handle or to extend the emergency call. The operator, with the emergency transfer circuit of the invention, can select an emergency toll switchboard trunk circuit and can "by-pass" the malfunctioning switching equipment to gain access to the outside world. The operator also can monitor the transmission of this trunk circuit and request the parties using it to release it, and can pre-empt the trunk circuit if the parties fail to acknowledge the request. No special keys are required, and no special modifications to either the toll switchboard or switching equipment is required.

The emergency transfer circuit is designed to interface with any E and M signaling toll switchboard trunk circuit (e.g. A.E. 30-31, WECO 3 CL, SCC-3 and the like) and any E and M type signaling trunk associated with any switching system. No modifications are required to existing circuits, the emergency transfer circuit being designed to be inserted between the existing trunk circuit and the associated facilities. The only leads required are the transmission leads, the E and M signaling leads— the lead "JC" from the toll switchboards manufactured by GTE Automatic Electric Company or the sleeve lead (S) from other manufacturers and the OS lead (out-of-service lead) associated with the HU (high usage) trunk circuit. The emergency transfer circuit therefore is generally universally adaptable to most, if not all, types of systems.

Accordingly it is an object of the present invention to provide an improved emergency transfer circuit, for permitting an operator to extend a call should there be a malfunction in the telephone communication switching equipment.

BRIEF DESCRIPTION OF THE DRAWINGS

Similar reference characters refer to similar parts throughout the several views of the drawings.

DETAILED DESCRIPTION

Figure 1:
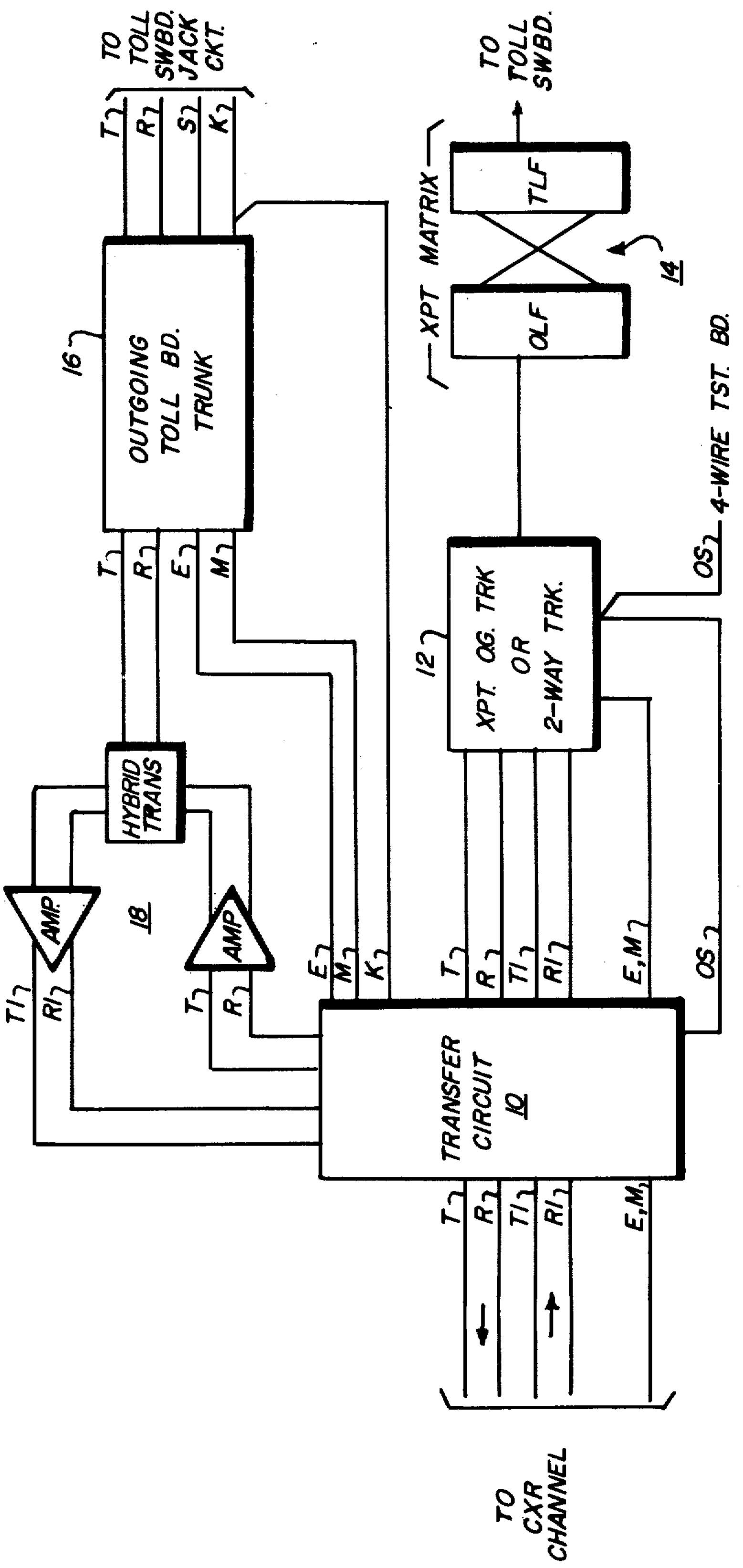
FIG. 1 is a block diagram schematic generally illustrating the emergency transfer circuit incorporated into a telephone communication switching system.

Referring now to the drawings, in FIG. 1 there is generally illustrated a typical switching arrangement for extending a call from a toll switchboard to a distant office via, for example, a carrier (CXR) channel. Normally, the call is routed by the operator at the toll switchboard to trunk circuit 12 which may be a crosspoint tandem system (XPT) outgoing trunk or a two-way trunk by means of the switching equipment 14. The trunk circuit 12 is coupled into the CXR channel, in the well known manner.

As discussed above, in accordance with the present invention, an emergency transfer circuit 10 is provided and is interfaced with a toll switchboard trunk circuit 16 to handle emergency-type traffic via the toll switchboard in the event of a malfunction in the switching equipment 14. In the illustrated embodiment, the toll switchboard trunk circuit 16 is coupled via a four-wire repeater 18, however, two-way type circuits can as well be used.

Figure 2:
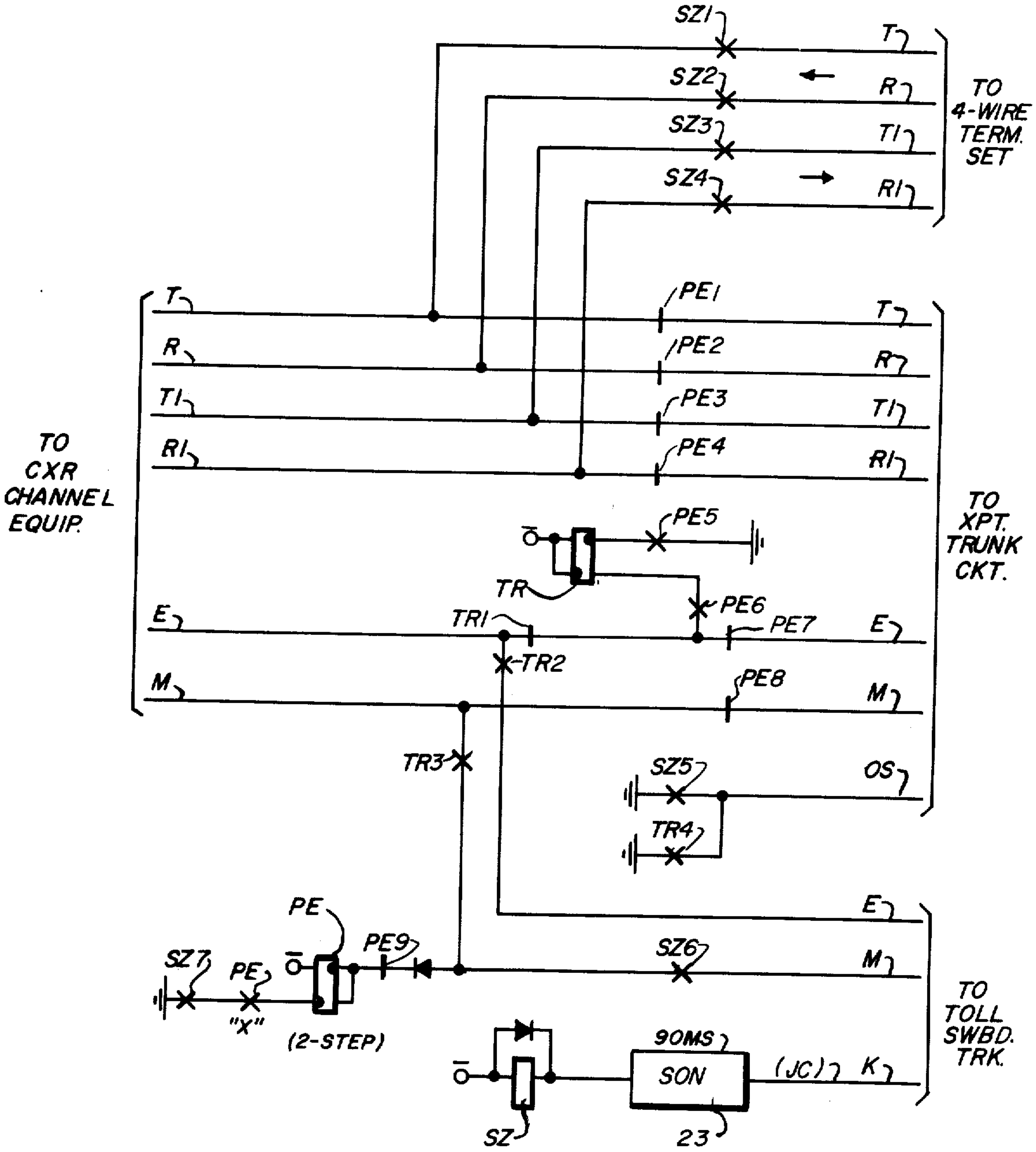
FIG. 2 is a schematic of the emergency transfer circuit.

The emergency transfer circuit 10 is illustrated in FIG. 2, and it can be seen that the lead K which corresponds to the conductor that usually accompanies the transmission tip and ring leads (T and R leads) of a switched connection and provides for miscellaneous functions necessary to the control and supervision of the connection is coupled through a slow operate network (SON) 23 and a relay SZ to negative battery. This lead K corresponds to, for example, the JC lead from GTE Automatic Electric toll switchboards and to the S lead from other manufacturers' toll switchboards. The transmission leads T, R, T1 and R1 from the repeater 18 are coupled through normally open contacts SZ1–SZ4 of the relay SZ, to the transmission leads T, R, T1 and R1 extending to the CXR channel equipment. The signaling lead M is coupled through normally open contact SZ6 of relay SZ, normally closed contact PE9 of a relay PE, the relay PE which is a two step type relay, to negative battery. The signaling lead M also extends through the relay PE, its "X" contact and a normally open contract SZ7 of relay SZ, to ground. The signaling leads E and M both are connected to the E and M leads extending to the CXR channel equipment, by means of normally open contacts TR2 and TR3 of relay TR. The leads E and M from the trunk circuit 12 are disconnected from the E and M leads to the CXR channel equipment, when relay PE operates to open its normally closed contacts PE7 and PE8. The E lead from the trunk circuit 12 also is coupled through normally closed contact PE7 and normally open contact PE6 of relay PE, and relay TR to negative battery. Ground also is extended through normally open contact PE5 of relay PE, and relay TR to negative battery.

During normal operation, the transmission leads T, R, T1 and R1 and the signaling leads E and M from the trunk circuit 12 (FIG. 1) extend directly through the emergency transfer circuit 10 to the CXR channel equipment. In the event of a malfunction in the switching equipment 14, an operator can extend an emergency call by seizing the trunk circuit 16, in normal fashion. Seizure of the trunk circuit 16 is detected on the signaling lead K, by the relay SZ. The slow operate network 23 provides a delay of approximately 90 ms in the operation of relay SZ, which upon operating, connects the transmission leads T, R, T1 and R1 to the operator's trunk circuit 16 via the repeater 18 when it closes its contacts SZ1–SZ4. The delay in the operation of relay SZ is provided to allow sufficient time for the trunk circuit 16 to place resistance battery through relay PE on the signaling lead M.

The operator then operates her ring key to cause the trunk circuit 16 to forward a 100 ms ± 30 ms ground (on-hook) pulse on the signaling lead M, in the normal manner. This ground pulse causes relay PE to operate to close its X contact, and the ground extended through the contacts SZ7 and X causes relay PE to operate fully. Relay PE in operating fully opens its contacts PE1–PE4 to open the transmission leads T, R, T1 and R, and the signaling leads E and M at its contacts PE7 and PE8 from the trunk circuit 12. The signaling lead M, in opening, indicates a disconnect, and the signaling lead E is transferred through contact PE6 and relay TR to negative battery. The disconnect indication on the signaling lead M causes the forward switch train to release, and the signaling lead E prevents relay TR from operating until the distant office is ready to accept an outgoing call, at which time ground is removed on the signaling lead E. This absence of ground on lead E and the ground which is extended through contact PE5 causes relay TR to operate and to close its contacts TR2 and TR3 to couple the signaling leads E and M from the trunk circuit 16 to the E and M leads to the distant office, via the CXR channel equipment. The operation of relay TR therefore transfers the signaling leads E and M to the trunk circuit 16 for use by the operator in extending the emergency call.

Removal of the operator's cord will return the operation to normal, by releasing relay PE. During the establishment of the connection through the emergency transfer circuit 10, ground was placed on the lead OS (out-of-service lead), when both of the relays SZ and TR operated, at their contacts SZ5 and TR4, respectively. Removal of this ground allows normal switch traffic to resume.

It also may be noted that the arrangement permits the operator to monitor the conversation on the transmission leads T, R, T1 and R1, when relay SZ operates to close its contacts SZ1–SZ4, should the trunk circuit be in use. The operator can request the parties to "hang-up" due to the emergency condition and, should they fail to acknowledge her request, operation of her ring key will be detected as a pre-empt signal, via the operation of relay PE in the manner described above.

If the trunk circuit is a two-way type circuit, preempting can only be accomplished when the trunk circuit is used in the outgoing direction, since incoming calls on two-way type circuits are under control of the originating office and will await for the timed disconnect to occur before transferring the control leads to the operator. The E lead therefore is connected to the relay TR to prevent its operation, as described above, until the distant office is ready to accept an outgoing call from the operator. It also prevents a complete transfer from occurring when the original call is an incoming call.

Within other manufacturer's toll switchboards, negative battery normally is extended or forwarded to the emergency transfer circuit 10 on the S lead. In such case, means for detecting this negative battery and for converting the same to extend ground forward is provided between the S lead and the K lead. Otherwise, if a ground is forwarded on the S lead, the latter is connected directly to the K lead.

It will thus be seen that the objects set forth above, among those made apparent from the preceding description, are efficiently attained and certain changes may be made in carrying out the above method. Accordingly, it is intended that all matter contained in the above description shall be interpreted as illustrative and not in a limiting sense.

Now that the invention has been described, what is claimed as new and desired to be secured by Letters Patent is:

1. In combination with a communication system having a toll switchboard connectible through a switching network to an outgoing trunk circuit extending towards a distant office and having transmission leads and signaling leads, an emergency transfer circuit for permitting an operator to extend a call to the distant office via a toll switchboard trunk circuit in the event of a malfunction in said switching network comprising first relay means operable upon seizure of said toll switchboard trunk circuit by the operator to couple the transmission leads of said toll switchboard trunk circuit with said transmission leads of said outgoing trunk circuit, second relay means operable by the operator after the operation of said first relay means to open the signaling leads of said outgoing trunk circuit to thereby indicate a disconnect and hence cause the switch train in the distant office to release, said second relay means further being operable to couple one of the signaling leads of said outgoing trunk circuit to a third relay means, the distant office upon switch train release, causing return of a signal on said one signaling lead to operate said third relay means, said third relay means in operating connecting the signaling leads of said outgoing trunk to the signaling leads of said toll switchboard trunk circuit for use by the operator in extending the emergency call.

2. The emergency transfer circuit of claim 1, wherein the operation of said first relay means is delayed to permit said toll switchboard trunk circuit to place resistance battery on one of said signaling leads.

3. The emergency transfer circuit of claim 2, wherein said second relay means is a two-step relay including a preliminary make contact, and is operated by said toll switchboard trunk circuit to close said preliminary make contact and then fully operated by a ground extended through said preliminary make contact; said toll switchboard trunk circuit operated in response to the ring key in the toll switchboard.

4. The emergency transfer circuit of claim 1, wherein an operator can monitor a conversation transmitted over said transmission leads from said outgoing trunk circuit, to determine that said outgoing trunk circuit is in use and said first relay means is operated.

5. The emergency transfer circuit of claim 4, wherein the operation of said second relay means opens the transmission leads from said outgoing trunk circuit, whereby said transmission leads are coupled only to said toll switchboard trunk circuit.

6. The emergency transfer circuit of claim 1, wherein said signaling leads comprise an E lead and M lead, the M lead from said toll switchboard trunk circuit being coupled to said second relay means, and wherein the operation of said first relay means is delayed to permit said toll switchboard trunk circuit to place resistance battery on said M lead.

7. The emergency transfer circuit of claim 6, wherein said second relay means is a two-step relay including a preliminary make contact, and is operated by said toll switchboard trunk circuit to close said preliminary make contact, said second relay being fully operated by a ground extended to it when said preliminary make contact is closed; said toll switchboard trunk circuit operated in response to the ring key in the toll switchboard.

* * * * *